Dec. 22, 1964 T. R. KOONS ETAL 3,162,067
HOLE SAW
Filed Nov. 23, 1962

INVENTOR
THEODORE R. KOONS
CHARLES B. PITTINGER
BY Leonard Bloom
ATTORNEY

United States Patent Office 3,162,067
Patented Dec. 22, 1964

3,162,067
HOLE SAW
Theodore R. Koons, Finksburg, and Charles B. Pittinger, Reisterstown, Md., assignors to The Black and Decker Manufacturing Company, Towson, Md., a corporation of Maryland
Filed Nov. 23, 1962, Ser. No. 239,727
1 Claim. (Cl. 77—69)

The present invention relates to a hole saw, and more particularly, to a hole saw comprising a driving body member, a replaceable tubular blade, and an economically-formed peripheral bayonet connection therebetween.

In the prior art of which we are aware, tubular hole saws have long been utilized; such hole saws are rotated by a suitable power driver, such as a portable electric drill, and are adapted to cut a cylindrical plug from a work piece of wood, metal, or other materials. Usually, the hole saw has a coaxial central piloting member, such as a twist drill bit; and the hole saw itself is generally cup-shaped and is provided with a base plate having an aperture through which the piloting member protrudes. The hole saw is detachably secured to the driving body by means of a locking nut which holds the base plate of the hole saw against the driving body; and in some specific cases, the cup-shaped hole saw has been made more readily detachable by means of an axial bayonet-type of connection between its base plate and a cooperating base plate formed on the driving body.

Moreover, the tubular portion of the hole saw is provided with one or more longitudinal slots or equivalent apertures, such that a screwdriver blade or other ejection tool is inserted therein for ejecting the workpiece plug from the hole saw. Other means resorted to in the prior art for ejecting the workpiece plug or core comprise a plurality of sliding ejection pins carried by the driving body member and adapted to pass through the base plate of the hole saw, or else, a spring-loaded detent member may be used to automatically eject the workpiece plug; but generally, these ejection means, whether manual or automatic, have been cumbersome, unwieldly to operate, expensive, and largely unsatisfactory.

In addition, some hole saws have been made with replaceable blades, the latter usually being formed from band stock rolled into a partially-completed cylindrical shape and adapted to cooperate with one of a series of concentric trepans formed in the driving mandrel, the replaceable blade being held in place by a suitable set screw. This latter method, while providing a replaceable tubular hole saw blade, nevertheless is disadvantageous inasmuch as it requires the removal of a set screw to remove the replaceable blade, and also, because the driving mandrels needed to accommodate a wide variety of blades become somewhat bulky and cumbersome and also expensive.

Additionally, the prior art has resorted to a tubular replaceable hole saw blade which is secured to a driving body member by means of a peripheral bayonet connection; this bayonet connection comprises a driving element carried by one of the members and a cooperating bayonet slot formed in the other member. The driving body may carry the driving element, while the cooperating bayonet slot may be formed in the tubular hole saw blade. These constructions, however, are not entirely satisfactory. The peripheral bayonet locking element usually involves a machined-out tongue in the blade member, or else a locking pin suitably retained in the body member, which, to manufacture, is awkward, time-consuming, and hence expensive.

Accordingly it is an object of the present invention to provide a hole saw whose body member has an annular shoulder together with an annular flange extending therefrom, in combination with an economically-formed peripheral bayonet connection between the annular flange and the tubular hole saw blade, wherein the hole saw bears against the annular flange, thereby accommodating substantially all of the axial or thrust loads, and wherein the interlocking members of the bayonet connection are generally required to accommodate only radial loads.

It is yet another object of the present invention to provide a hole saw having a replaceable blade which includes a plurality of circumferentially-spaced lanced-out tabs, each of which cooperates with a bayonet-type slotted opening formed in the body member.

It is a still further object of the present invention to provide a replaceable hole saw blade having means to automatically strip the workpiece plug from the piloting member whenever the blade is removed from the driving body following the completion of a cut.

It is a yet further object of the present invention to provide a replaceable hole saw blade, one which is manufactured easily and economically, and one which is durable and sturdy for trouble-free performance in the field.

These and other objects of the present invention will become apparent from the following specification, taken in conjunction with the enclosed drawings, in which.

Figure 7:
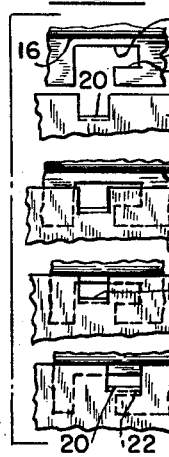
Figure 4:
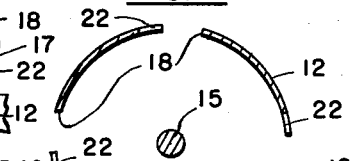
FIGURE 4 is a section view taken along the lines 4—4 of FIGURE 2 showing the plurality of cooperating bayonet-type slotted openings formed within the extended annular flange of the driving body member.
Figure 5:
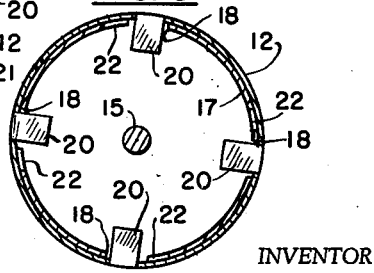
FIGURE 5 is a view similar to that of FIGURE 4, but showing the replaceable tubular blade telescopically received over the annular flange of the body member, such that the tabs on the blade enter within the respective openings of the corresponding bayonet slots.
Figure 6:
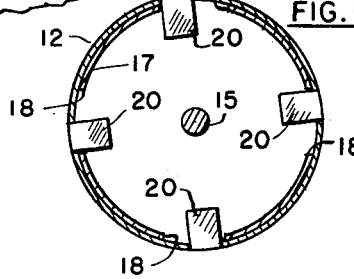

FIGURE 6 is a view corresponding substantially to that of FIGURE 5, but showing how the replaceable tubular blade has been circumferentially rotated so as to lock the tubular replaceable blade to the body member; and FIGURE 7 is a sequence view showing the replaceable tubular blade being telescopically received over the annular flange on the driving body member, and further showing the blade being circumferentially rotated so as to interlock the blade and the body member for rotation in unison, the main body portion of each of the tabs ultimately having an axial or longitudinal clearance with respect to the bottom of its cooperating bayonet slot.

Figure 1:
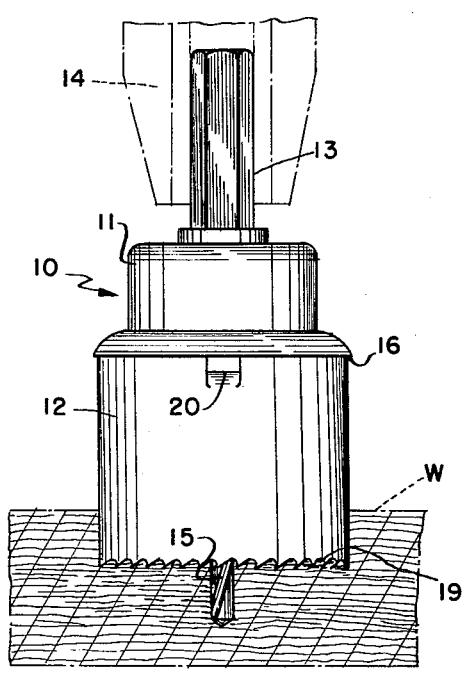
FIGURE 1 is a front elevation of the assembled hole saw, showing the driving connection with the chuck in broken lines, and further showing a typical workpiece in which the hole saw is adapted to cut a cylindrical plug.
Figure 2:
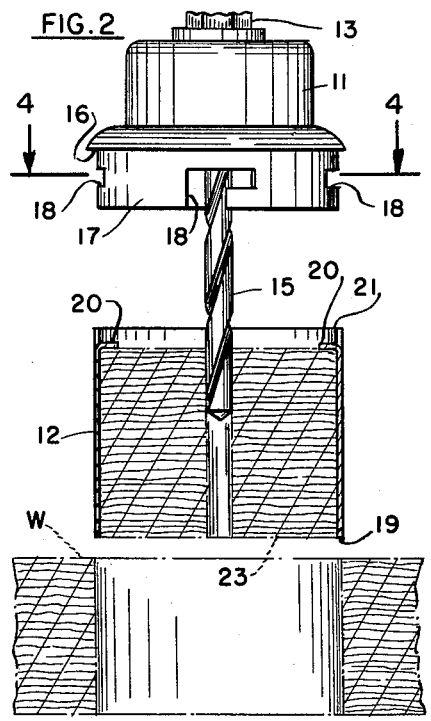
FIGURE 2 is a view corrsponding to that of FIGURE 1, but showing the replaceable tubular blade in exploded relationship to the driving body member, and further showing how the cooperating bayonet connecting members are adapted to automatically strip the cylindrical workpiece plug from the coaxial central piloting member in the process of removing the tubular replaceable blade from the body member.
Figure 3:
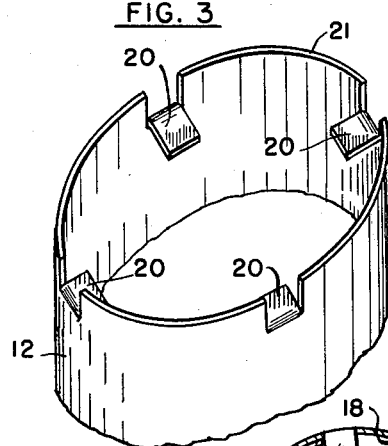
FIGURE 3 is a partial perspective view of the rear portion of the replaceable tubular blade, showing the plurality of inwardly-projecting tabs, each of which is directed radially towards the longitudinal center line of the hole saw.

With reference to FIGURES 1 and 2, there is illustrated an assembled hole saw 10, which may be any particular length and diameter, and which comprises a driving body member 11 and a replaceable tubular blade 12. The body member 11 has a suitable non-circular shank 13 adapted to be received within the chuck 14 of a suitable power driver, such as a hand-portable electric drill;

and a coaxial central piloting member, such as the twist drill bit 14, is carried by the body member 11 so as to guide or pilot the hole saw 10 within the workpiece W. The body member 11 has an annular shoulder (or stop) 16 and further has an annular flange 17 extending therefrom. The annular flange 17 is provided with a plurality of circumferentially-spaced bayonet slots 18, preferably (but not necessarily) a total of four, which facilitates a quick and easy removal of the replaceable blade 12. The blade 12 is formed as a substantially-continuous hollow cylindrical member, open at both ends, and having suitable saw teeth 19 formed on its exposed forward end. The blade 12 is further provided with a cooperating plurality of circumferentially-spaced tabs 20, see FIGURE 3, and each of the tabs 20 is radially-spaced from the adjacent side wall of the sleeve 12 and is directed radially inwardly towards the piloting member 15. Preferably, each of the tabs 20 is formed by first forming a pair of parallel longitudinal slits from the end of the blade 12, and then bending in the tabs 20 at right angles to the blade 12; however, other means of forming the tabs 20, as well as other means of forming a peripheral bayonet connection between the replaceable blade 12 and the driving body member 11, are equally within the scope of the present invention.

With reference to FIGURES 4 through 7, the replaceable tubular blade 12 is telescopically fitted with respect to the body member 11, such that the blade 12 is preferably received over the annular flange 17, and such that each of the tabs 20 enters the opening of its respective bayonet slot 18, see FIGURE 5; and the blade 12 is then rotated with respect to the annular flange 17, such that each of the tabs 20 is fitted within its respective bayonet slot 18, see FIGURE 6, thereby coupling the blade 12 to the driving body member 11 for rotation in unison, the locking direction of the bayonet connection being in the direction of rotation imparted by the chuck 14 to the driving body member 11. Moreover, and as shown more particularly in FIGURE 7, when the blade 12 is thus locked onto the body member 11, the end 21 of the blade 12 bears against the annular shoulder 16 of the body member 11, while an axial clearance (slightly exaggerated in FIGURE 7) exists between the main body portion of each tab 20 and the bottom 22 of its respective bayonet slot 18. Consequently, the tabs 20 generally accommodate only radial loads, while substantially all of the axial or thrust load is accommodated by the end 21 of the blade 12 bearing against the shoulder 16 of the body member 11.

With reference again to FIGURE 2, the locking tabs 20 will automatically engage the workpiece plug 23 and will strip the plug 23 from the piloting member 15 whenever the blade 12 is disconnected from the driving body member 11, thereby obviating the necessity for longitudinal slots in the tugular portion of the hole saw blade.

The combination of the present invention resides in a tubular replaceable hole saw blade, open at both ends, together with a peripheral quick-disconnect bayonet connection between the replaceable blade and an annular flange on the driving body member, wherein substantially all of axial thrusts are taken up against an annular shoulder on the body member, and wherein, preferably, the locking portions of the peripheral bayonet connection are adapted to automatically strip the workpiece plug from the piloting member whenever the replaceable blade is removed from the driving body following the completion of a cutting operation. Moreover, the replaceable blade, its peripheral bayonet locking elements, as well as the driving body members may be manufactured easily and very economically, thereby rendering the application of the present invention both feasible and practical from a commercial standpoint.

Obviously, many modifications may be made without departing from the basic spirit of the present invention; and accordingly, within the scope of the appended claim, the invention may be practiced other than has been specifically described.

We claim:

A hole saw comprising:

(a) a driving body member having an annular shoulder and further having an annular flange extending from said shoulder;

(b) a central piloting member carried coaxially within said body member;

(c) a replaceable tubular blade comprising a substanitally-continuous hollow cylindrical member, open at both ends, and telescopically received over said annular flange of said body member;

(d) cutting teeth formed along the exposed forward end of said blade;

(e) a plurality of substantially-coplanar inwardly-projecting lanced out tabs formed in the opposite end of said blade, each of which is directed radially towards said piloting member;

(f) said tabs being circumferentially-spaced uniformly with respect to each other, and each of said tabs being substantially at right angles to said blade;

(g) a corresponding plurality of bayonet-type slotted openings, circumferentially-spaced uniformly with respect to each other, in said annular flange to receive said respective tabs, whereby said blade is detachably mounted to said body member, and whereby said tabs automatically strip the workpiece plug from said piloting member whenever said blade is removed from said body member following the completion of a cut; and (h) the respective main body portions of each of said tabs having an axial clearance with respect to the respective bottoms of said respective bayonet slots, whereby the axial thrust loads are absorbed substantially by said annular shoulder on said driving body member, and whereby the tabs are generally required to accommodate only radial loads.

References Cited in the file of this patent

UNITED STATES PATENTS

| 58,924 | Webster | Oct. 16, 1860 |
| 2,779,361 | McKiff | Jan. 29, 1957 |

FOREIGN PATENTS

| 170,193 | Great Britain | Oct. 20, 1921 |
| 1,038,129 | France | May 6, 1953 |